United States Patent Office 3,480,628
Patented Nov. 25, 1969

3,480,628
3-CHLOROTRIAZINOINDOLES
Alfred W. Chow, Radnor, and Norman M. Hall, Norristown, Pa., assignors to Smith Kline & French Laboratories, Philadelphia, Pa., a corporation of Pennsylvania
No Drawing. Filed Dec. 22, 1967, Ser. No. 692,722
Int. Cl. C07d 55/10, 27/56; A61k 27/00
U.S. Cl. 260—249.5
5 Claims

ABSTRACT OF THE DISCLOSURE 3-chlorotriazino[5,6-b]indoles are prepared by reaction of the corresponding 3-hydroxy compounds with phosphorus oxychloride. The chloro compounds are intermediates convertible into amino compounds with antiviral activity.

---

This invention relates to heterocyclic compounds useful as intermediates for preparing other biologically active heterocyclic compounds.

In particular the invention relates to 3-chloro-as-triazino[5,6-b]indoles of the following structural formula:

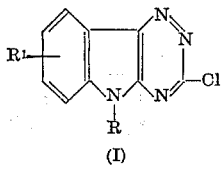

(I)

wherein
R is hydrogen, lower alkyl of up to 4 carbon atoms, or phenyl lower alkyl of up to 9 carbon atoms; and
$R^1$ is hydrogen, halo, lower alkyl of 1 to 4 carbon atoms, phenyl lower alkyl of 7 to 9 carbon atoms, lower alkoxy of 1 to 4 carbon atoms, nitro, or trifluoromethyl.

The compounds of the invention are intermediates useful in preparing the hydroxyalkylaminotriazinoindoles of Formula II.

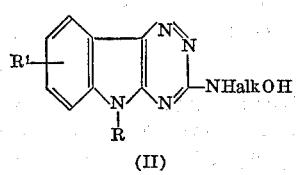

(II)

wherein R and $R^1$ are as defined above, and alk is straight or branched chain alkylene of 2 to 10 carbon atoms.

These triazinoindoles are antiviral agents, being effective in inhibiting the growth of rhinoviruses. They are especially active against rhinovirus strains 1059, 2060, and HGP.

The preferred compound of the invention is 3-chloro-5-methyl-5H-as-triazino[5,6-b]indole (III).

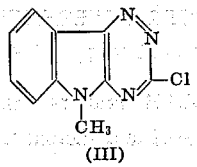

(III)

The compounds of Formula I are prepared by treating the corresponding 3-hydroxy compound with phosphorus oxychloride in the presence of a base such as N,N-dimethylaniline. The 3-hydroxy starting materials are described in Belgian Patent 653,089 and British Patent 1,023,720.

For purpose of describing the present invention, the term "lower alkyl" is intended to include methyl, ethyl, propyl, and butyl; "phenyl lower alkyl" is intended to include benzyl, phenethyl, and phenylpropyl. Although compounds wherein R is methyl are preferred, compounds wherein R is benzyl and phenethyl are also important. The term "halo" is intended to include fluoro, chloro, bromo, and iodo. The term "alk" is intended to refer to straight chain and branched chain alkylene groups, including, but not being limited to, propylene $(CH_2CH_2CH_2)$ 2,2-dimethylpropylene, 1,1-dimethylpropylene $[(CH_2CH_2C(CH_3)_2]$ ethylene, butylene, pentylene, hexylene, octylene, and decylene.

The following examples are intended to illustrate the manner and process of making and using the invention, but are not to be construed as limiting the scope thereof. Temperatures stated are in degrees Centigrade.

EXAMPLE 1

3-chloro-5-methyl-5H-as-triazino[5,6-b]indole

A mixture of 1.0 g. (0.005 mole) of 3-hydroxy-5-methyl-5H-as-triazino[5,6-b]indole, 4.0 ml. of $POCl_3$, and 2.0 ml. of dimethylaniline is refluxed for 0.75 hour, cooled slightly, and carefully poured onto 75–100 g. of cracked ice. The brown solid is filtered off, washed with water, dried, and recrystallized from an ample quantity of ethanol to give the product, M.P. 219.5–220.5°.

Use of 3-hydroxy-5-phenylethyl-5H-as-triazino[5,6-b]indole or 3-hydroxy-5-benzyl-5H-as-triazino[5,6-b]indole in the above reaction results in the formation of 3-chloro-5-phenethyl-5H-as-triazino[5,6-b]indole or 3-chloro-5-benzyl-5H-as-triazino[5,6-b]indole, respectively.

Use of 3-hydroxytriazinoindoles substituted in the benzene ring with an 8-chloro, 7-methyl, 8-ethyl, 7-methoxy, or 8-trifluoromethyl group gives the corresponding 3-chlorotriazinoindoles, similarly substituted in the benzene ring.

The intermediate compounds of the invention are used by treating them with aminoalcohols of Formula IV. The 3-chloro compounds are refluxed with the appropriate amino alcohol in an inert solvent such as toluene.

$H_2NalkOH$ (IV)

The product 3-hydroxyalkylaminotriazinoindoles (II) are then isolated by conventional means. They are then formulated into tablets, capsules, or nasal sprays, according to conventional pharmaceutical techniques, using standard pharmaceutical excipients, and then administered orally or intranasally to animal subjects susceptible to or infected by rhinoviruses. They are administered in doses of 5–25 mg./kg., preferably orally.

The use of the compounds of the invention is illustrated by the preparation of biologically active hydroxyalkylaminotriazinoindoles, as follows:

EXAMPLE 2

3-(3-hydroxy-3-methylbutylamino)-5-methyl-5H-as-triazino[5,6-b]indole

A stirred solution of 35 g. (0.5 mole) of distilled methyl vinyl ketone in 300 ml. of benzene is treated dropwise over a 20 minute period with a solution of 98.6 g. (0.5 mole) of distilled dibenzylamine in 300 ml. of benzene. The mixture is allowed to stand overnight at room temperature, the benzene is evaporated in vacuo at a temperature below 45°, and the residual 4-dibenzylamino-2-butanone is recrystallized from petroleum ether (30–60°); M.P. 56.5–58°.

To a stirred solution of 110 ml. of ethereal 3 M methyl magnesium bromide in 300 ml. of ether is added over a 25 min. period a solution of 26.7 g. (0.1 mole) of the above amino ketone in 100 ml. of ether. The mixture is refluxed on the steam bath for 2 hours, kept at room temperature overnight, and 200 ml. of 2 N Na$_2$CO$_3$ solution added over a 45–50 minute period with stirring and cooling. The ethereal layer is separated, dried, and evaporated to give 4-dibenzylamino-2-methyl-2-butanol.

A 14.15 g. (.05 mole) sample of the dibenzylamino alcohol in ethanol is hydrogenated at 1000 p.s.i. and 100° for 4 hours using a 10% palladium on charcoal catalyst. The catalyst is filtered off and the alcohol distilled off at atmospheric pressure. The residue is dissolved in a small volume of ether, filtered, the ether evaporated in vacuo, and the residue distilled at 77–78°/15 mm. through a short microware Vigreux column to give 4-amino-2-methyl-2-butanol, $n_D^{25}$ 1.4494.

A stirred mixture of 2.18 g. (0.01 mole) of 3-chloro-5-methyl-5H-as-triazino[5,6-b]indole, 2.58 g. (0.025 mole) of 4-amino-2-methyl-2-butanol, and 20 ml. of toluene is heated at reflux for 45 minutes, after which an additional 0.25 g. (0.0024 mole) of the amino alcohol is added and refluxing continued for an additional 45 minutes. The toluene is evaporated in vacuo and the residue triturated with water. The resulting crude product is recrystallized from isopropanol to give the title compound, M.P. 190–191.5°.

EXAMPLE 3

3-(3-hydroxy-2,2-dimethylpropylamino)-5-methyl-5H-as-triazino[5,6-b]indole

To a cooled, stirred solution of 200 g. (2.8 moles) of isobutyraldehyde and 224 g. of 37% Formalin is added in small portions 160 g. of solid K$_2$CO$_3$. The mixture is stirred at room temperature for a period of 1 hour after the completion of the addition, extracted with ether (ca. 1–1.5 liters), and the ether extracts are dried and evaporated to give 3-hydroxy-2,2-dimethylpropionaldehyde.

To a solution of 330 g. of the crude aldehyde in 600 ml. of alcohol is added 100 g. of liquid ammonia and 60 g. of Raney Ni. This mixture is hydrogenated for 2 hours at 1000 p.s.i. The catalyst is filtered off, the solvent evaporated, and the resulting liquid distilled in vacuo through a 6″ silvered Vigreux column to give 3-amino-2,2-dimethylpropanol.

A mixture of 10.9 g. (0.05 mole) of 3-chloro-5-methyl-5H-as-triazino[5,6-b]indole, 15.5 g. (0.15 mole) of the above amino alcohol, and 150 ml. of toluene is refluxed for 1.5 hours. The solid which forms is filtered off, washed with 100 ml. of water, and dried to give a crude product, which is recrystallized from 750 ml. of isopropanol to give the title product, M.P. 226–227°.

Use of 3-hydroxypropylamine in the above reaction with 3-chloro-5-methyl-5H-as-triazino[5,6-b]indole gives 3-(3 - hydroxypropylamino)-5-methyl-5H-as-triazino[5,6-b]indole, M.P. 164–165°.

Use of 6-hydroxyhexylamine in the above reaction with 3-chloro-5-methyl-5H-as-triazino[5,6-b]indole gives 3-(6-hydroxyhexylamino) - 5 - methyl-5H-as-triazino[5,6-b]indole, M.P. 124–125°.

Use of 3-hydroxypropylamine in the above reaction with 3 - chloro - 5 - phenethyl-5H-as-triazino[5,6-b]indole gives 3 - (3 - hydroxypropylamino)-5-phenethyl-5H-as-triazino[5,6-b]indole, M.P. 154–155°.

The biologically active triazinoindoles are formulated conventionally, as illustrated by the following examples:

A representative tablet containing the antiviral compound 3-(3-hydroxy-3-methylbutylamino)-5-methyl - 5H-as-triazino[5,6-b]indole has the following composition:

| | Mg. |
|---|---|
| Antiviral compound | 250 |
| Terra alba | 150 |
| Sucrose, USP | 88 |
| Starch, USP | 20 |
| Magnesium stearate, USP | 5 |

A representative capsule containing the same antiviral compound has the following composition:

| | Mg. |
|---|---|
| Antiviral compound | 250 |
| Lactose | 150 |
| Magnesium stearate, USP | 6 |

A representative intranasal spray suspension containing the same antiviral compound has the following composition:

| | | |
|---|---|---|
| Antiviral compound | percent w./v | 5.000 |
| Sodium carboxymethyl cellulose | percent w./v | 1.000 |
| Sodium citrate | percent w./v | 0.200 |
| Potassium biphthalate | percent w./v | 0.130 |
| Eucalyptol, N.F. | v./v | 0.020 |
| Thimerosal, N.F. | percent w./v | 0.001 |

Purified water q.s. ad 100.000.

We claim:
1. A compound of the formula

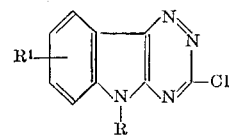

wherein
R is hydrogen, lower alkyl of 1 to 4 carbon atoms, or phenyl lower alkyl of 7 to 9 carbon atoms; and
R$^1$ is hydrogen, halo, lower alkyl of 1 to 4 carbon atoms, phenyl lower alkyl of 7 to 9 carbon atoms, lower alkoxy of 1 to 4 carbon atoms, nitro, or trifluoromethyl.

2. A compound as claimed in claim 1, in which R$^1$ is hydrogen.

3. A compound as claimed in claim 2, in which R is methyl, benzyl or phenethyl.

4. A compound as claimed in claim 3, in which R is methyl, being the compound 3-chloro-5-methyl-5H-as-triazino[5,6-b]indole.

5. A compound as claimed in claim 3, in which R is phenethyl, being the compound 3-chloro-5-phenethyl-5H-as-triazino[5,6-b]indole.

References Cited

FOREIGN PATENTS 6,410,823  3/1965  Netherlands.

OTHER REFERENCES

King et al.: J. Chem. Soc. pp. 2314–8 (1948).

JOHN D. RANDOLPH, Primary Examiner
JOHN M. FORD, Assistant Examiner

U.S. Cl. X.R.
424—249